United States Patent [19]

Gardziella et al.

[11] Patent Number: 5,043,365
[45] Date of Patent: Aug. 27, 1991

[54] NOVEL MOLDING MATERIALS

[75] Inventors: Arno Gardziella, Witten-Rudinghausen; Alois Kwasniok, Iserlohn; Peter Adolphs, Menden-Halingen; Ralf Wetzig, Iserlohn, all of Fed. Rep. of Germany

[73] Assignee: Rutgerswerke AG, Fed. Rep. of Germany

[21] Appl. No.: 407,232

[22] Filed: Sep. 14, 1989

[30] Foreign Application Priority Data

Oct. 5, 1988 [DE] Fed. Rep. of Germany ....... 3833855

[51] Int. Cl.$^5$ .............................................. C08K 5/51
[52] U.S. Cl. ................................... 523/143; 524/541; 528/162
[58] Field of Search ...................... 523/143; 528/162; 524/541

[56] References Cited

U.S. PATENT DOCUMENTS

| 3,590,902 | 7/1971 | Westwood et al. | 164/526 |
| 3,686,106 | 8/1972 | Tideswell | 523/143 |
| 3,726,867 | 4/1973 | Robins | 523/143 |
| 4,072,649 | 2/1978 | Kubens | 523/143 |
| 4,436,881 | 3/1984 | Laitar | 525/504 |
| 4,590,229 | 5/1986 | Gardikes | 523/143 |

FOREIGN PATENT DOCUMENTS 2050400 1/1981 United Kingdom .

Primary Examiner—Paul R. Michl
Assistant Examiner—Yong S. Lee
Attorney, Agent, or Firm—Bierman and Muserlian

[57] ABSTRACT

A granular molding material with a binder comprising a phenol novolac and a polyisocyanate which hardens upon addition of amine catalysts wherein the molar ratio of phenol to formaldehyde in the novolac is 1:0.25 to 1:0.5 and has the formula

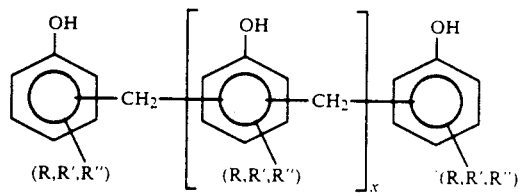

wherein R, R' and R" are individually selected from the group consisting of hydrogen, alkyl of 1 to 12 carbon atoms, hydroxy, cycloalkyl of 3 to 12 carbon atoms and an anellated ring and X is an integer from 0 to 4 or >4 with the percent molar distribution based on X is as follows:

| when X = 0: | 20–55% |
| X = 1: | 15–30% |
| X = 2: | 10–30% |
| X = 3: | 0–50% |
| X ≧ 4: | 0–2.5% | for the production of improved foundry cores and molds.

14 Claims, No Drawings

NOVEL MOLDING MATERIALS

STATE OF THE ART

In the production of resin-bonded molding materials for the production of mold parts such as foundry cores and molds, a granular material is mixed with a binder consisting of a hardenable resin or resin mixture and a latent hardener. The compounds obtained are hardened after shaping. Technically advantageous for this are cold gasing processes (gas hardening processes). In such a process, one component is co-introduced into the hardening reaction in gas or aerosol form and the function of this component may be specific and different from process to process. The oldest and well introduced process of this kind with organic binders is the poyurethane gas hardening process known from DE-PS 1,583,521, which is known in the German foundry industry as "Cold Box process."

In the Cold Box process, the molding material mixture consists generally of quartz sand to which is admixed a phenolic resin containing hydroxyl groups dissolved in organic solvents and a diisocyanate also dissolved in solvents. The total amount of dissolved resin and diisocyanate is generally between 1.2 and 2.0 per cent referred to 100 parts by weight of the quartz sand. For light-metal casting, the percentage is chosen near the lower limit and for iron casting, near the upper limit for technical reasons. The premix is placed into molding patterns or mold boxes and is gased therein with suitable tertiary amines in gaseous or aerosol form. Due to the catalytic effect of the amine, spontaneous hardening of the binder takes place.

According to DE-PS 1,583,521, phenolic resins of the formula

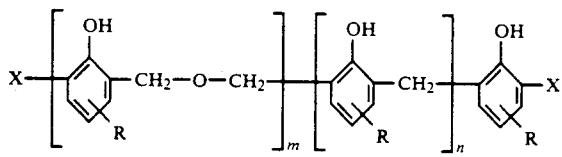

are preferred in this process where R is hydrogen or a phenolic substituent in the meta-position to the hydroxyl group, and X is hydrogen or methylol, the sum of m and n is at least 2 and the ratio of m to n is at least 1, and the molar ratio of methylol groups to hydrogen (as terminal group) is at least 1.

A technical disadvantage of the Cold Box process is the limited shelf life of the molding material since the polyurethane-polyaddition reaction starts up somehow already even without amine addition in the core sand. This results in reduced strength if the sand is processed some time after its preparation (poor "bench life") or if the room temperatures are especially high. Another disadvantage is the free phenol content of the resins used which is generally between 5 and 10%. An especially great disadvantage is the poor disintegration of the molding materials at low casting temperatures as is the case in light-metal casting.

OBJECTS OF THE INVENTION

It is an object of the invention to provide a novel granular molding material having improved properties. It is another object of the invention to provide an improved process for producing foundry cores and molds and the improved molds and cores.

These and other objects and advantages of the invention will become obvious from the following detailed description.

THE INVENTION

The novel granular molding materials of the invention with a binder are comprised of a phenol novolac and a polyisocyanate which hardens upon addition of amine catalysts wherein the molar ratio of phenol to formaldehyde in the novolac is 1:0.25 to 1:0.5 and has the formula

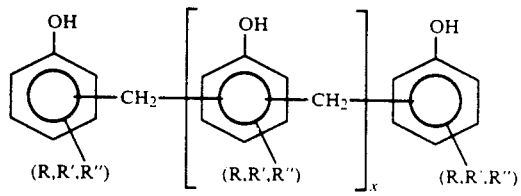

wherein R, R' and R" are individually selected from the group consisting of hydrogen, alkyl of 1 to 12 carbon atoms, hydroxy, cycloalkyl of 3 to 12 carbon atoms and an anellated ring and X is an integer from 0 to 4 or >4 with the percent molar distribution based on X is as follows:

| | | |
|---|---|---|
| when X = 0: | | 20-55% |
| X = 1: | | 15-30% |
| X = 2: | | 10-30% |
| X = 3: | | 0-50% |
| X ≧ 4: | | 0-2.5% |

The disadvantages of the process of DE-PS 1,583,521 are overcome by the use of applicants phenol novolac whose molar ratio of phenol to formaldehyde is 1:0.25 to 1:05 and which has the formula

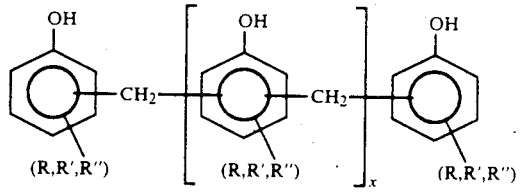

where R, R' and R" are individually selected from the group consisting of hydrogen, alkyl of 1 to 12 carbon atoms, cycloalkyl of 3 to 12 atoms, hydroxyl or an anellated ring, and X is 0 or is an integer, and the percent molar distribution based on X is as follows:

| | |
|---|---|
| X = 0: | 20-55%, preferably 25-35% |
| X = 1: | 15-30%, preferably 17-23% |
| X = 2: | 10-30%, preferably 13-30% |
| X = 3: | 0-50%, preferably 30-40% |
| X ≧ 4: | 0-2.5%, preferably 0-0.5% |

Free, unreacted phenol: 0-0.1%. The mean molecular weight of these novolacs is about 280-480, preferably 350-420 D.

Molding materials for the Cold Box process made with these binders are stable in storage and largely phenol-free. The strength of mold parts produced therefrom is substantially greater than conventional molding materials for Cold Box processes even after a long storage time at elevated temperatures. After a casting operation, particularly after light-metal casting at 600°–750° C., the mold bodies disintegrate easily.

The novolacs to be employed in the invention in such molding materials can, however, not be regarded as included therein for these resins were not known at the time of filing of the DE-PS 1,583,521. DE-OS 3,705,540 was the first to describe novolacs which are produced with a phenol-formaldehyde ratio of 1:0.2 to 1:0.4 and these phenolic novolacs are employed as intermediate binders and carbon formers for the production of high temperature resistant molding materials. One can operate with or without addition of hexamethylene tetramine as hardening agent for phenolic novolacs.

In coking (processed with or without hexamethylene tetramine), they prove to be good carbon formers which impart high strength to refractory products. One skilled in the art could not expect, therefore, that in a similar tempering process (casting opertion), these novolacs are especially unstable and lead to easily disintegrating mold parts. It is surprising, therefore, that the molding materials of the invention are suitable for the Cold Box process, particularly in light-metal casting (600° to 750° C.), i.e., that they disintegrate especially well after pouring and show excellent stripping properties.

The phenolic novolac of the invention is condensed in a manner known in itself from a phenol and formaldehyde in the molar ratio of 1:0.25 to 1:0.5 in aqueous acid solution. Examples of phenols which may be used are mono- or poly-nucleic phenols or mixtures of said compound classes, that is, mono- as well as poly-nucleic phenols. Specific examples are phenol itself as well as its alkyl-substituted homologues such as ortho-, meta- or para-cresol, or higher alkylated phenols such as e.g., 3,5-xylenol, 3,4-xylenol, 2,3,5-trimethyl-phenol, 3-ethyl-phenol, 3,5-diethyl-phenol, p-butyl-phenol, 3,5-dibutyl-phenol, p-amyl-phenol, p-cyclohexyl-phenol, p-octyl-phenol, or nonyl-phenol as well as multivalent phenols such as resorcinol or pyrocatechin and poly-nucleic phenols, preferably naphthols, i.e., compounds with anellated rings.

These phenols are reacted in acid aqueous solution with formaldehyde or a substance able to split off formaldehyde under the reaction conditions. Products of this kind are e.g., formaldehyde itself or its commercial 30–50% solution (formalin) or substances which contain formaldehyde bound in chemically loose form such as formaldehyde bisulfite, urotropin, trioxymethylene or paraformaldehyde.

The novolac resins thus obtained are solid at room temperature, begin to melt above 30° C., and are readily soluble in a plurality of aromatic or aliphatic solvents. Examples of preferred solvents are the group of esters of aliphatic and aromatic mono- and poly-carboxylic acids, ketones as well as mixtures of said solvents with aromatic solvents.

The second component or polyisocyanate of the binder of the invention contains preferably two to five isocyanate groups and mixtures of polyisocyanates may be used as well as prepolymers obtained by reaction of excess polyisocyanate with a multivalent alcohol, for example those from toluylene diisocyanate and ethylene glycol can be used. Suitable polyisocyanates include aliphatic polyisocyanates such as hexamethylene diisocyanate, alicyclic polyisocyanates such as 4,4'-dicyclohexyl methane-diisocyanate, aromatic polyisocyanates such as 2,4- or 2,6-toluylene diisocyanate, diphenyl methyl diisocyanate or their dimethyl derivatives. Other examples for suitable polyisocyanates are 1,5-naphthalene diisocyanate, triphenyl methane triisocyanate, ethylene diisocyanate or their methyl derivatives; polymethylene polyphenol isocyanate, or chlorophenylene-2,4-diisocyanate. Although all polyisocyanates react with the novolac, aromatic polyisocyanates, particularly diphenylmethane diisocyanate, triphenylmethane triisocyanate or their mixtures are preferred which are used in the usual solvents, notably aromatic solvent mixtures.

As granular material for the production of the molding materials of the invention are all granular high temperature resistant products, particularly quartz, chromite, olivine, zirconium sand or fire clay which can be used singly or in admixture with one another. For the production of the molding materials of the invention, dry granular material is mixed in a manner known in itself with 0.25 to 10% by weight, preferably 0.5–2.5% by weight, of binder.

The binder itself is prepared just before use by mixing the isocyanate component with the novolac solution, the quantities being selected so that during the hardening, at least all isocyanate groups can react with hydroxyl groups of the novolac. This is achieved if the polyisocyanate is employed in a quantity of 10 to 500, preferably 20 to 300 percent by weight, referred to phenolic resin.

The hardening of the molding materials of the invention occurs after their shaping by addition of catalytic quantities of amine compounds and this is done preferably by gasing the unhardened mold parts with amines at room temperature, the mold parts hardening within 60 seconds.

As gasing agents for spontaneous catalytic triggering of the hardening there are used preferably air or nitrogen mixtures of tertiary amines in gaseous or aerosol form. The preferred tertiary amines used are triethyl, dimethylethyl, or dimethyl isopropylamine.

The appropriately produced molds and cores for light-metal casting have the following advantages of the molding materials of the invention. The molding materials are processable longer than 10 hours. The molds and cores fulfill the foundry technology requirements (strength, thermal properties, etc.) and for aluminum casting (at about 700° C.), one stays far below the maximum working space concentrations for phenol. Although the addition of disintegration-promoting additives customary until now is dispensed with, the molds and cores disintegrate readily after pouring. The castings can be emptied of molding material residues without any problem (without additional tempering process) by shaking.

In the following examples there are described several preferred embodiments to illustrate the invention. However, it is to be understood that the invention is not intended to be limited to the specific embodiments.

EXAMPLE 1

Production of a Phenolic Novolac of the Invention 94 kg of phenol were mixed with 940 g of oxalic acid and the mixture was heated to about 100° C. 16.7 kg of formalin (45%) were added over 3 hours with stirring at reflux. After the addition, the reaction mixture was heated at reflux to a content of free formalin of <0.3% with the low-boiling components (water, phenol) then being removed by distillation to a free phenol content of <0.5%. The fused resin was dissolved in butyl glycol acetate in a weight ratio of 1:1 and cooled to room temperature.

The molecular weight distribution of the base novolac and the viscosity of the resin solutions are given in Table I.

EXAMPLE 2

Using the procedure of Example 1 with a phenol: formaldehyde ratio of 1:0.35 [94 kg of phenol and 23.2 kg of formalin 45%], a phenol novolac with the properties of Table 1 was prepared.

EXAMPLE 3

Using the procedure of Example 1, a phenol novolac with a phenol: formaldehyde ratio of 1:0.45 (94 kg of phenol) 30 kg of formalin [45%] was prepared.

COMPARISON EXAMPLE A 50 kg of a conventional medium molecular weight novolac (Bakelite ® Resin K 790 L) were dissolved in 50 kg of butyl glycol acetate.

COMPARISON EXAMPLE B 50 kg of a conventional high molecular weight novolac (Bakelite ® Resin K 790H) were dissolved with 50 kg of butyl glycol acetate.

COMPARISON EXAMPLE C

Conventional phenol ether resol-based Cold Box binder (Bakelite ® Resin 8763 GK or Isocure ® 352) were used.

EXAMPLE 4

As phenolic resin solution, a resin solution from Example 1 was used.

EXAMPLE 5

As phenolic resin solution, a resin solution from Example 2 was used.

EXAMPLE 6

As phenolic resin solution, a resin solution from Example 3 was used.

COMPARISON EXAMPLE 4

As phenolic resin solution, a resin solution from Comparison Example A was used

COMPARISON EXAMPLE 5

As phenolic resin solution, a resin solution from Comparison Example B was used.

COMPARISON EXAMPLE 6

A binder from Comparison Example 6 was used as binder.

With the molding material mixtures of Examples 4 to 6 and Comparison Examples 4 to 6, the following tests are carried out:

1. Cold Bending Strength

The mold material mixtures were compacted in a laboratory core shooter at a shooting pressure of 4 bars in appropriate molds. The compacted molding material was gased with gaseous dimethylethylamine (1 g of amine per 1 kg of sand mixture) and then flushed with air at 70° C. for 15 seconds. The resulting test specimens had the dimensions 165×22.5×22.5 mm and the bending strength was determined on these test specimens 1

TABLE 1

| | Molecular Weight Distribution of the Base Novolac | | | | |
| --- | --- | --- | --- | --- | --- |
| | Example 1 | Example 2 | Example 3 | Comparison Example A | Comparison Example B |
| Mean molecular weight | 280 | 350 | 420 | 550 | 700 |
| Free phenol (%) | 0.1 | 0.1 | 0.1 | 0.1 | 0.1 |
| 2 Nuclei x = 0 (%) | 50 | 35 | 28 | 13 | 7 |
| 3 Nuclei x = 1 (%) | 28 | 22 | 18 | 11 | 6 |
| 4 Nuclei x = 2 (%) | 20 | 14 | 12 | 9 | 6 |
| >4 nuclei x > 2 (%) | 1.9 | 28.9 | 41.1 | 66.9 | 80.9 |
| Viscosity of the resin solution at 20° C. [mPa × s] | abt. 180 | abt. 240 | abt. 300 | abt. 550 | abt. 1,800 |

EXAMPLES AND COMPARISON EXAMPLES A TO C

With the resin solutions of Examples 1 to 3 and Comparison Examples A and B as well as the Comparison Example C, molding material mixtures were prepared according to the following formulation:

4000 g of quartz sand (Type H 33, Haltern Quartz Works) were admixed with 24 g of a commercial activator (a diphenylmethane-4,4'-diisocyanate diluted with aromatic solvents) (Bakelite ® Activator 8600 H or Isocure ® 652) in a paddle mixer for 15 minutes. Then 24 g of a resin solution described above in Examples 1 to 3 and Comparison Examples A and B or the conventional binder described in Comparison Example C were added and mixing was continued for another 1.5 minutes.

minute, 1 hour and 24 hours after the gasing.

2. Bench Life ("Processibility Period")

The bending strength of test 1 of a fresh, 3 hour, and 8 hour molding material mixture was measured.

3. Disintgegration Properties

The weight of one half of a test specimen 24 hours old was determined. Then, the sample was tempered for 5 minutes at 600° C. in a muffle furnace. After cooling (at the earliest 1 hour after removal from the furnace), the sample was placed on a screen (bottom and cover) of a mesh width of 1000/μm and were shaken on a laboratory screen machine at a fixed frequency of 60 seconds. The disintegration quantity (quantity of sand passed through the screen) was determined in percent.

4. Disintegration Test In Practice

The mixtures of Examples 4 to 6 and Comparison Examples 4 to 6 cores were made as a practical test and after the pouring, the decoring was determined. Suction tube cores (light-metal caating) were made and poured. After cooling, decoring was done on an industrial vibration system.

The time to complete decoring and the degree of decoring were determined and the results are summarized in Table 2. The advantage of the condensation products of the invention is clearly evident from the table.

TABLE 2

| Example | Cold Bending Strength in N/cm² (per test 1) and bench life (per test 2) 1st value: Fresh molding material 2nd value: Molding material 3 h old 3rd value: Molding material 8 h old | | | Disintegration quant. (per test 3) (%) | Disintegration in practice (per test 4) |
|---|---|---|---|---|---|
| | After 1 min | After 1 h | After 24 h | | |
| 4 | 300 | 325 | 335 | 88 | complete after |
| | 320 | 340 | 350 | | 15 sec |
| | 330 | 340 | 330 | | |
| 5 | 290 | 310 | 315 | 87 | complete after |
| | 310 | 300 | 300 | | 15 sec |
| | 300 | 310 | 290 | | |
| 6 | 290 | 270 | 300 | 81 | complete after |
| | 280 | 280 | 280 | | 20 sec |
| | 280 | 280 | 280 | | |
| Compar. 4 | 230 | 260 | 280 | 59 | not completely decored |
| | 220 | 260 | 280 | | after 25 sec |
| | 190 | 240 | 260 | | (small lumps) |
| Compar. 5 | 190 | 255 | 270 | 55 | not completely decored |
| | 180 | 220 | 260 | | after 25 sec |
| | 150 | 210 | 230 | | (large lumps) |
| Compar. 6 | 300 | 410 | 460 | 37 | not completely decored |
| | 325 | 320 | 310 | | after 25 sec |
| | no longer processable | | | | (large lumps) |

Various modifications of the compositions and method of the invention may be made without departing from the spirit or scope thereof and it is to be understood that the invention is intended to be limited only as defined in the appended claims.

What we claim is:

1. A granular molding material with a binder comprising a phenol novolac and a polyisocyanate which hardens upon addition of amine catalysts wherein the molar ratio of phenol to formaldehyde in the novolac is 1:0.25 to 1:0.35 and has the formula

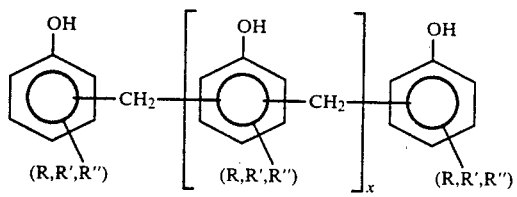

wherein R, R' and R" are individually selected from the group consisting of hydrogen, alkyl of 1 to 12 carbon atoms, hydroxy, cycloalkyl of 3 to 12 carbon atoms and an anellated ring and X is an integer from 0 to 4 or >4 with the percent molar distribution based on X is as follows:

| when X = 0: | 20–55% |
|---|---|
| X = 1: | 15–30% |
| X = 2: | 10–30% |
| X = 3: | 0–50% |

| X ≧ 4: | 0–2.5% |
|---|---|

2. A granular molding material of claim 1 wherein the percent molar distribution based on X is as follows:

| When X = 0: | 22–35% |
|---|---|
| X = 1: | 17–23% |
| X = 2: | 13–20% |
| X = 3: | 30–40% |
| X ≧ 4: | 0–0.5% |

3. A granular molding material of claim 1 wherein the phenol novolac is in the form of 40 to 70% by weight solutions in an aromatic or aliphatic solvent.

4. A granular molding composition of claim 3 wherein the solvent is at least one member of the group consisting of esters of aliphatic mono- and polycarboxylic acids, esters of aromatic mono- and polycarboxylic acids, ketones and mono- and polyethers.

5. A granular molding material of claim 1 wherein the granular material is selected from the group consisting of quartz, chromite, olivine, zirconium sand, fire clay and mixtures thereof.

6. A granular molding material of claim 1 containing an amine hardener added in gaseous or aerosol form.

7. A granular molding material of claim 1 containing an amine hardener selected from the group consisting of triethylamine, dimethylethylamine and dimethylisopropylamine.

8. In a process for the production of foundry cores and molds, the improvement comprising using as the molding material the granular molding material of claim 1.

9. The process of claim 8 wherein the percent molar distribution based on X is as follows:

| When X = 0: | 22–35% |
|---|---|
| X = 1: | 17–23% |
| X = 2: | 13–20% |
| X = 3: | 30–40% |
| X ≧ 4: | 0–0.5%. |

10. The process of claim 8 wherein the phenol novolac is in the form of 40 to 70% by weight solution in an aromatic or aliphatic solvent.

11. The process of claim 8 wherein the solvent is at least one member of the group consisting of esters of aliphatic mono- and polycarboxylic acids, esters of aromatic mono- and polycarboxylic acids, ketones and mono- and polyethers.

12. The process of claim 8 wherein the granular material is selected from the group consisting of quartz, chromite, olivine, zirconium sand, fire clay and mixtures thereof.

13. In a process for the production of foundry cores and molds for light-metal casting at casting temperatures below 750° C., the improvement comprising using the granular molding material of claim 1 as the molding material.

14. A foundry mold or core produced by the process of claim 8.

* * * * *